United States Patent [19]

Council et al.

[11] Patent Number: 4,790,060

[45] Date of Patent: Dec. 13, 1988

[54] METHOD FOR HOLDING A CONDUIT TO A CHANNEL

[76] Inventors: Jerry W. Council, 14456 Dartmoor, Norwalk, Calif. 90650; Richard C. Kessinger, 13126 Wardman, Apt. 1, Whittier, Calif. 90602

[21] Appl. No.: 129,465

[22] Filed: Dec. 7, 1987

[51] Int. Cl.[4] ............................................. F16K 7/00
[52] U.S. Cl. .................................. 29/525.1; 248/68.1
[58] Field of Search ..................... 29/428, 464, 526 R; 248/68.1, 74.1

[56] References Cited

U.S. PATENT DOCUMENTS 4,185,802  1/1980  Myles et al. .................. 246/68.1 X
4,445,657  5/1984  Breckenridge ................ 248/74.1 X
4,516,296  5/1985  Sherman ....................... 248/74.1 X Primary Examiner—Timothy V. Eley
Attorney, Agent, or Firm—Edgar W. Averill, Jr.

[57] ABSTRACT

A method for holding a conduit at a right angle against the open edge of an elongated channel. First and second conduit holding members are inserted into the channel adjacent the opposite sides of a conduit. A clasp member is affixed between an exterior portion of the conduit holding members. The clasp member has a clasp arm which is rotated to tighten the two conduit holding members together and to hold the conduit to the channel.

4 Claims, 2 Drawing Sheets

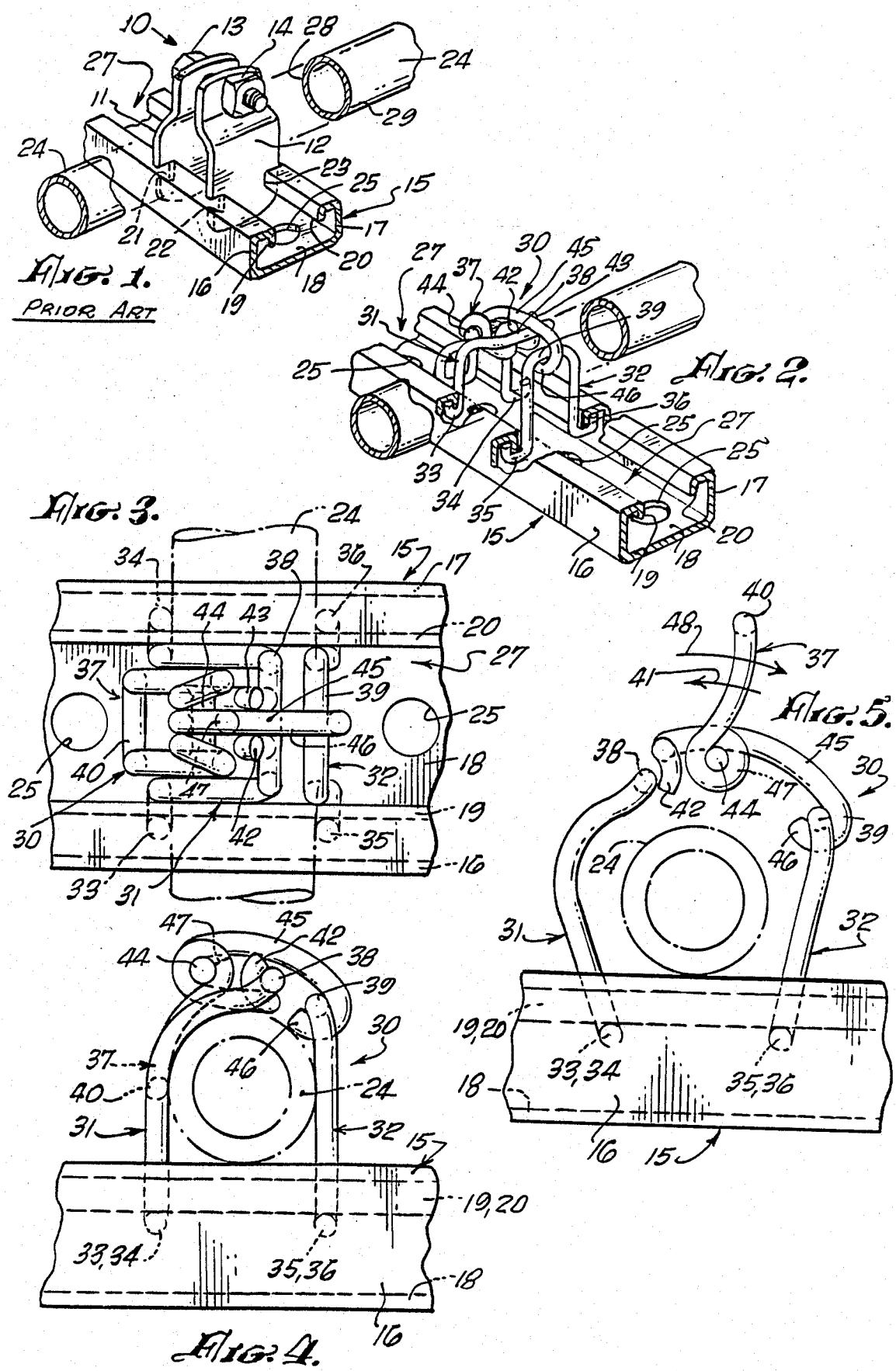

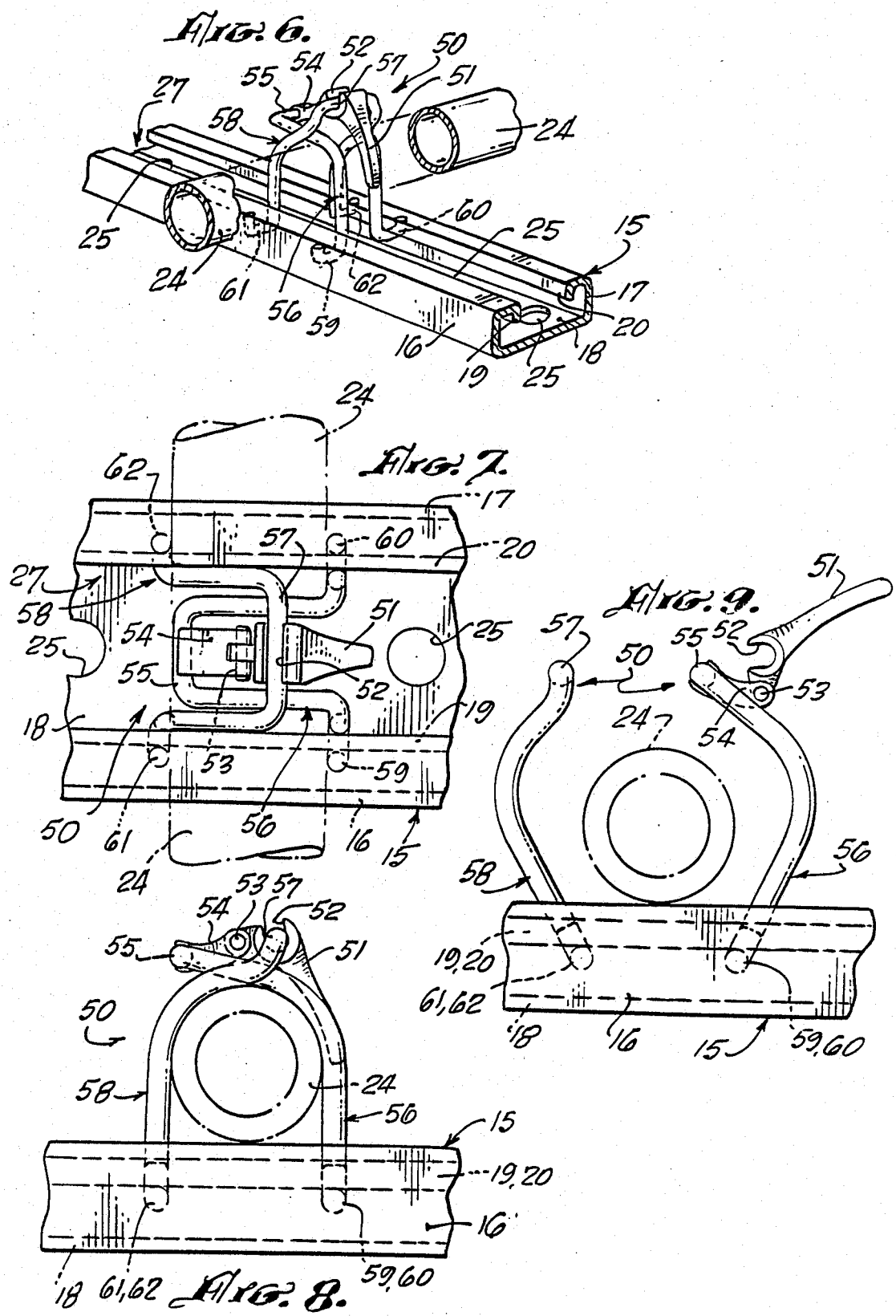

METHOD FOR HOLDING A CONDUIT TO A CHANNEL

BACKGROUND OF THE INVENTION

The field of the invention is electrical and electronic transmission equipment and the invention relates more particularly to the hardware for supporting conduits through which conductors are passed.

A common prior art type of clamp is shown in U.S. Pat. No. 3,486,726 and indicated as "prior art" in FIGS. 2 and 3 of that patent. Another commonly used system is shown in U.S. Pat. No. 3,721,412 where a pair of wire members are held over a conduit by bending one of the wire members back upon itself and surrounding the other wire member. Yet another system is shown in U.S. Pat. No. 3,463,428 which is quite similar to that shown in above-identified U.S. Pat. No. 3,486,726. The clamps of the type shown in the above-identified patents have a major drawback which is becoming more evident in modern office and industrial structures where the use of electronic equipment and additional electrical equipment has greatly increased the number of conduits which are held against the support channels. It is not uncommon for the channels to be in relatively inaccessible positions, close to a ceiling or wall, and it is often very difficult to hold a nut in one hand and a bolt in another to hold the two clamp members together. Similarly, it is often difficult to perform the bending step of the wire clamp of U.S. Pat. No. 3,721,412. Also, it is occasionally necessary to remove one of the conduits, and the same problem of finding space to insert a screwdriver or socket wrench, or to unbend the wire clamp, arises. There is, thus, a need for a clamp which may be readily inserted and removed in inaccessible places with one hand.

SUMMARY OF THE INVENTION

It is an object of the present invention to provide a clamp for holding a conduit against a channel, which clamp may be easily attached or released from the conduit.

The present invention is for an easily attachable clamp and the method of use thereof. The method is one for holding a conduit at a right angle against the open edge of an elongated channel member. The elongated channel member is of the type having a base and two legs extending at right angles from its base toward the open edge thereof. The legs terminate in longitudinal, inwardly and basewardly directed arms. The method includes the steps of grasping a first conduit holding method having first and second hooks spaced apart to be held under the arms of the channel and having an exterior central portion therebetween and inserting the member into the channel and positioning it adjacent one side of the conduit. A second conduit holding member is similarly grasped, inserted and positioned adjacent the other side of the conduit. Next, a clasp member is affixed between the exterior central portions of the first and second conduit holding members and, lastly, the clasp member is closed to tighten the conduit holding members against the conduit and against the elongated channel member. Preferably, the conduit holding members are fabricated from wire and an inmroved clasp assembly is affixed to one of the exterior central portions and a grasping arm is affixable to the other exterior central portion. A clasp arm is affixed to the grasping arm and the clasp arm moves the exterior central portions together when it is rotated from an open position to a closed position.

BRIEF DESCRIPTION OF THE DRAWINGS

FIG. 1 is a perspective view of the prior art clamp.

FIG. 2 is a perspective view of a first embodiment of the clamp of the present invention.

FIG. 3 is an enlarged plan view of the clamp of FIG. 2.

FIG. 4 is a side view of the clamp of FIG. 2 showing the clamp in a closed position.

FIG. 5 is a side view of the clamp of FIG. 2 showing the clamp in an open position.

FIG. 6 is a perspective view of a second configuration of the clamp of the present invention.

FIG. 7 is an enlarged plan view of the clamp of FIG. 6.

FIG. 8 is a side view of the clamp of FIG. 6 showing the clamp in closed position.

FIG. 9 is a side view of the clamp of FIG. 6 showing the clamp in an opened position.

DESCRIPTION OF THE PREFERRED EMBODIMENTS

A widely used conduit clamp is shown in perspective view in FIG. 1 and indicated generally by reference character 10. Clamp 10 has two clamp halves 11 and 12 held together by a bolt 13 and nut 14. Clamp 10 is held to an elongated channel 15 which is the same as the channel used with the clamp of the present invention. Channel 15 has a pair of legs 16 and 17 which extend at right angles from a base 18. legs 16 and 17 have longitudinal, inwardly and basewardly directed arms 19 and 20, respectively. Clamp half 11 has a pair of notches, one of which is indicated by reference character 21 in FIG. 1. Similarly, clamp half 12 has a pair of notches 22 and 23. The base of each of these notches contacts the lower edge of arms 19 and 20 when the clamp halves 11 and 12 are clamped around a conduit 24. Conduit 24 is contacted on one side 28 by clamp half 11 and on the other side 29 by clamp half 12. Channel 15 has a plurality of holes 25 through the center of base 18. Several hangar bolts are placed through several of the holes 25 along a length of channel to hold the channel to a ceiling or other member. Although the channel is typically oriented with its base 18 on the bottom and its open edge 27 oriented upwardly, it is also possible that the channel be held with the base on the top, or for that matter, in any orientation.

The prior art clamp shown in FIG. 1 does a satisfactory job in holding conduit 24 to channel 15 but clamp 10 is cumbersome, both to install and to remove. Because there is both a nut and a bolt, a screwdriver and a nut driver, typically two hands are required both for installation and removal, and when a conduit must be removed between a plurality of parallel conduits, the removal job can be very cumbersome.

An improved clamp that can be readily installed with one hand, and also removed with one hand, is shown in FIGS. 2 through 5 and indicated generally by reference character 30. Clamp 30 has two clamp halves which comprise a first conduit holding member 31 and a second conduit holding member 32. First conduit holding member 31 has a pair of outwardly directed hooks 33 and 34 which surround the longitudinal, inwardly and basewardly directed arms 19 and 20. Similarly, holding member 32 has a pair of hooks 35 and 36 which, likewise, fit under arms 19 and 20. A clasp assembly, indicated generally by reference character 37, is shown best in FIG. 3. Clasp 37 pulls the exterior central portion 38 of holding member 31 toward exterior central portion 39 of holding member 32. This is accomplished by the moving of clasp arm 40 in a counterclockwise direction indicated by arrow 41 in FIG. 5. Grasping arms 42 and 43 are integral with clasp arm 40 which, in turn, is pivotally held on pin 44 which is welded to clasp arm 40 and also supports hook 45. Hook 45 has a first hook end 46 which is held loosely around exterior central portion 39 of conduit holding member 32 and a second hook end 47 which is loosely held around pin 44. Thus, to close the clamp, grasping arms 42 and 43 are brought into contact with exterior central portion 38 of first conduit holding member 31 and the clasp arm 40 is rotated in a counterclockwise direction, wherein it moves from the position shown in FIG. 5 to that shown in FIG. 4. Grasping arms 42 and 43 push the exterior central portion 38 toward exterior central portion 39. This causes the first conduit holding member 31 to abut side 28 of conduit 24 and the second conduit holding member 32 to abut side 29 of conduit 24. This closing action can readily be accomplished with one hand and it is preferably that the first hook end 46 of hook 45 surround central portion 39 so that it is held in place thereon. Of equal importance, the clamp 30 may be readily removed from conduit 24 with one hand merely by rotating clasp arm 40 in a clockwise direction as indicated by reference character 48 as indicated in FIG. 5. Preferably, clasp arm 40 is held adjacent side 28 of conduit 24 so that the resulting assembly utilizes a minimum of lateral space.

Another configuration of the clamp of the present invention is shown in FIGS. 6, 7, 8 and 9 where the clamp is generally indicated by reference character 50. Clamp 50 has a clasp arm 51 which is preferably cast from aluminum, or other metal, and includes a grasping recess 52 and an opening which permits the arm 51 to be held to member 54. Member 54 is welded, or otherwise affixed, to the exterior central portion 55 of second conduit holding member 56. Grasping recess 52 contacts exterior central portion 57 of first conduit holding member 58. Clamp 50 is closed by rotating arm 51 in a clockwise position from the position shown in FIG. 9 to that shown in FIG. 8. Of course, conduit holding member 56 has a pair of hooks 59 and 60 and first conduit holding member 58 has a pair of hooks 61 and 62. This clamping action can also readily be accomplished with one hand and its release is, likewise, easily accomplished with one hand.

The method of the present invention involves the affixing of a clamp about the conduit 24 against an elongated channel 15, which channel has a pair of legs 16 and 17 extending at the right angle from a base 18, and the legs terminate in longitudinal, inwardly and basewardly directed arms 19 and 20. The method comprises the steps of grasping a first conduit holding member, such as member 31, said first conduit holding member having an exterior central portion 38 and having first and second outwardly directly hooks 33 and 34 which are spaced apart so that one hook fits under one arm 19 and the other hook fits under the other arm 20. The holding member is then inserted into the open edge 27 of channel 15 so that the hooks 33 and 34 fit around the arms 19 and 20. Holding member 31 is then positioned adjacent side 28 of conduit 24. Similarly, a second conduit holding member, such as member 32, is inserted into the channel and positioned adjacent side 29 of conduit 24. A clasp member 37 is affixed between the exterior central portion 38 of the first conduit holding member and the exterior central portion 39 of the second conduit holding member 32. The clamp is then closed to tighten the first and second holding members against the conduit and to removably hold the conduit to the elongated channel member.

This process greatly facilitates the installation and removal of conduits from channels of the type shown in the drawings. With the ever increasing use of electrical and electronic equipment, the updating of systems often requires the removal of conduits from the midst of a plurality of adjacent conduits, and the ability to accomplish this task with one hand greatly facilitates this step.

The two clamps shown in the drawings both utilize two generally U-shaped wire holding members which are a particularly easy to use configuration. It is, however, within the scope of the present invention that these holding members be stamped from metal, or otherwise fabricated, and the important feature of the present invention is the use of a clasp to facilitate the attachment of the two adjacent holding members. Although the word, "conduit," has been used herein, the clamp of the present invention is, of course, also useful for affixing water pipes, and other members, to elongated channels of the type shown in the drawings herein.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A method for holding a conduit at a right angle against the open edge of an elongated channel member, said elongated channel member being of the type having a base and two legs extending at right angles from its base toward the open edge of the channel and the legs terminating in longitudinal, inwardly and basewardly directed arms, said conduit having first and second sides, said method comprising:

grasping a first conduit holding member, said first conduit holding member having an exterior central portion and having first and second outwardly directed hooks for attachment under the arms of a channel member and said first and second hooks being spaced from one another so that one hook fits under one of the arms and the other hook fits under the other of the arms;

inserting the outwardly directed hooks of said first conduit holding member into the open edge of said channel member so that the outwardly directed hooks fit around the inwardly and basewardly directed arms of the channel;

positioning said first conduit holding member adjacent a first side of said conduit;

grasping a second conduit holding member, said second conduit holding member having an exterior central portion and having first and second outwardly directed hooks and said first and second hooks being spaced from one another so that one hook fits under one of the arms and the other hook fits under the other of the arms;

inserting the outwardly directed hooks of said second conduit holding member into the open edge of said channel member so that the outwardly directed hooks fit around the inwardly and basewardly directed arms of the channel;

positioning said second conduit holding member adjacent a second side of said conduit;

affixing a clasp member between the exterior central portion of the first conduit holding member and the exterior central portion of the second conduit holding member and over said conduit; and closing said clasp member to tighten the first and second conduit holding members against the conduit and to removably hold said conduit to said elongated channel member.

2. The method of claim 1 wherein said first and second conduit holding members are fabricated from wire.

3. The method of claim 1 wherein said clasp member is hingedly connected to one of said first and second conduit holding members.

4. The method of claim 1 wherein said clasp member has an elongated clasp arm and said closing step is performed by moving the clasp arm from an outwardly oriented position to an inwardly oriented position where it is positioned adjacent one of the conduit holding members.

* * * * *